United States Patent
Kreischer

(12) 
(10) Patent No.: US 11,808,652 B2
(45) Date of Patent: Nov. 7, 2023

(54) TESTING DEVICE FOR DETECTING THE CONTACT PRESSURE OF A VEHICLE SIDE WINDOW

(71) Applicant: TKR Spezialwerkzeuge GmbH, Gevelsberg (DE)

(72) Inventor: Torsten Kreischer, Wetter (DE)

(73) Assignee: TKR Spezialwerkzeuge GmbH

( * ) Notice: Subject to any disclaimer, the term of this patent is extended or adjusted under 35 U.S.C. 154(b) by 424 days.

(21) Appl. No.: 16/891,944

(22) Filed: Jun. 3, 2020

(65) Prior Publication Data

US 2020/0386640 A1    Dec. 10, 2020

(30) Foreign Application Priority Data

Jun. 6, 2019  (DE) .................... 10 2019 115 272.0

(51) Int. Cl.
| | |
|---|---|
| *G01L 5/16* | (2020.01) |
| *B60J 10/50* | (2016.01) |
| *B60J 10/90* | (2016.01) |
| *B60J 1/12* | (2006.01) |
| *B60J 1/20* | (2006.01) |

(52) U.S. Cl.
CPC .... *G01L 5/16* (2013.01); *B60J 1/12* (2013.01); *B60J 1/20* (2013.01); *B60J 10/50* (2016.02); *B60J 10/90* (2016.02)

(58) Field of Classification Search
CPC ..... G01L 1/04; G01L 5/16; B60J 10/50; B60J 10/90; B60J 1/12; B60J 1/20
USPC .................................................... 73/862.046
See application file for complete search history.

(56) References Cited

U.S. PATENT DOCUMENTS

| | | | | |
|---|---|---|---|---|
| 7,236,602 | B2 * | 6/2007 | Gustavsson | G10K 9/22 381/152 |
| 2003/0034896 | A1 * | 2/2003 | Dobson | G01L 3/1457 340/665 |

FOREIGN PATENT DOCUMENTS

| | | | | |
|---|---|---|---|---|
| CN | 202 693 327 U | | 1/2013 | |
| DE | 19826171 C1 | * | 10/1999 | ............ B60J 10/00 |
| DE | 10333136 A1 | * | 3/2005 | ............ B60J 10/00 |
| DE | 102004003200 | * | 8/2005 | |
| DE | 102016225511 A1 | * | 6/2018 | |
| DE | 102021108924 B3 | * | 9/2022 | ............ G01P 15/14 |
| EP | 1455044 A2 | * | 9/2004 | ............ B60J 10/00 |
| JP | H01 311239 A | | 12/1989 | |
| JP | 2001324393 A | * | 11/2001 | |

(Continued)

OTHER PUBLICATIONS

Extended European Search Report in European Patent Application No. EP 20169688.7, dated Oct. 5, 2020 (19 pages).

*Primary Examiner* — Octavia Davis Hollington
(74) *Attorney, Agent, or Firm* — ICE MILLER LLP

(57) ABSTRACT

A testing device for detecting a contact pressure of a vehicle side window contacting a window seal arranged on the bodywork. In order to provide a universally applicable testing device that can be used for different vehicle types and models and that allows for reliable determination of the contact pressures, the testing device is designed having a central processing unit comprising a power supply, an evaluation unit and a display unit for showing the determined contact pressure, and having a pressure measuring film that can be removably arranged on the vehicle side window in the region of the window seal and that is connected to the evaluation unit of the central processing unit.

20 Claims, 1 Drawing Sheet

(56) References Cited

FOREIGN PATENT DOCUMENTS

| JP | 2016159876 A | * | 9/2016 | ............. | B60R 11/02 |
| JP | 2020121712 A | * | 8/2020 | ............. | B60J 10/244 |

* cited by examiner

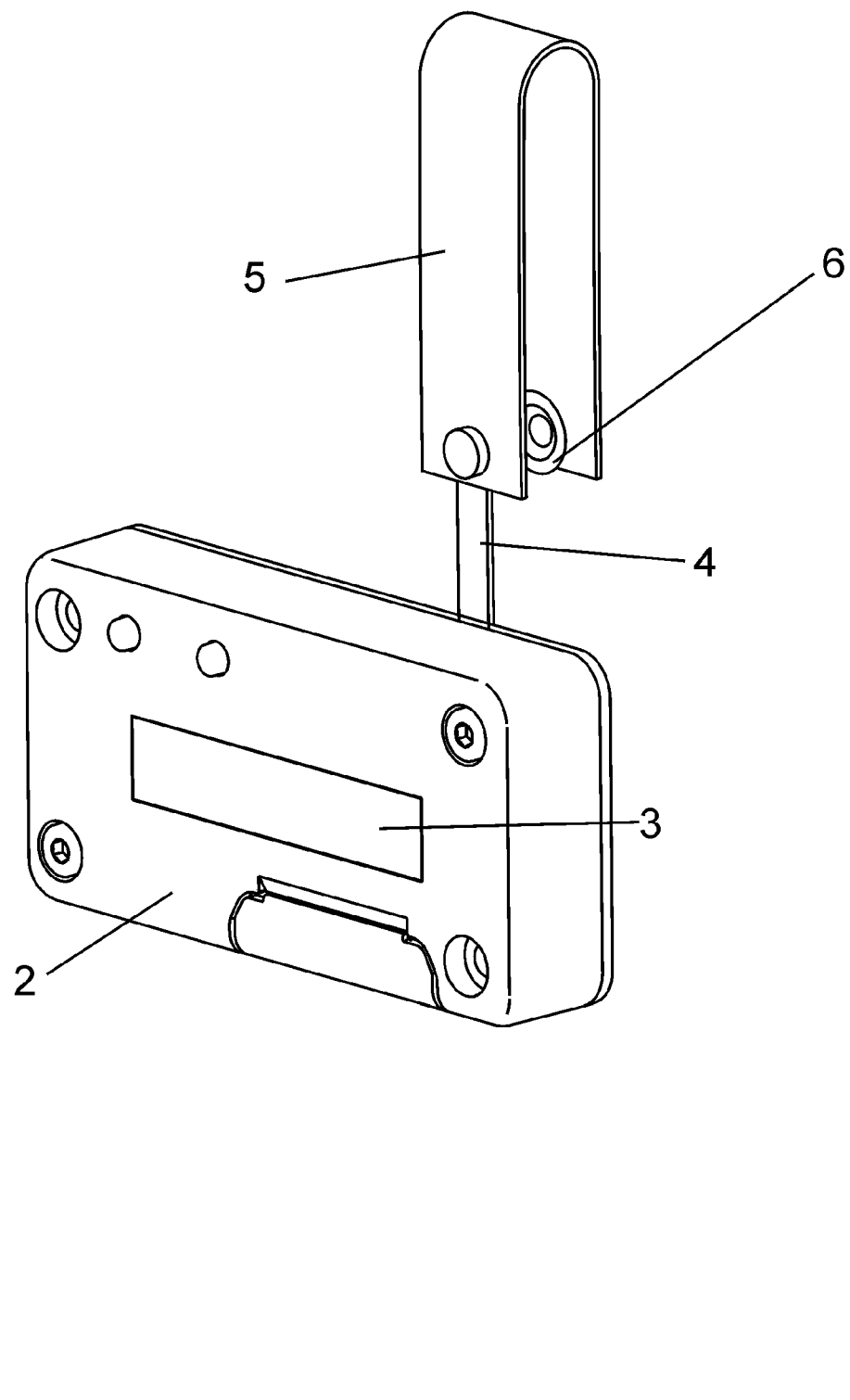

TESTING DEVICE FOR DETECTING THE CONTACT PRESSURE OF A VEHICLE SIDE WINDOW

This application claims the benefit of Germany Patent Application No. 10 2019 115 272.0, filed Jun. 6, 2019, which is incorporated herein by reference in its entirety.

The invention relates to a testing device for detecting the contact pressure of a vehicle side window contacting a window seal arranged on the bodywork.

Testing devices of the type mentioned at the outset are used in vehicles having frameless vehicle side windows, for example those used in vehicle doors of convertibles, to determine the contact pressure of the vehicle side windows on the window seal arranged on the bodywork in the closed position of the door.

In known testing devices of the type mentioned at the outset, the vehicle door is initially secured in a defined test position with respect to the vehicle bodywork that is different from the closed position of the vehicle door, with a fully extended vehicle side window. Subsequently, in said position, the position of the vehicle side window relative to the vehicle window seal fastened to the bodywork is determined by means of a testing device arranged on the vehicle side window. Based on the value determined at the testing device, the contact pressure of the vehicle side window on the window seal in the closed position of the vehicle door can then be indirectly determined. It is of paramount importance that the vehicle side window contacts the window seal so as to apply force thereto in order to ensure that the vehicle door is also rainproof in the region of the frameless vehicle side window.

Separate door strikers, for example, which are used solely in conjunction with the testing device, are used to secure the defined test positions of the motor vehicle door. They can be inserted into the door lock and then space the vehicle door apart from the vehicle bodywork, the door striker then resting on the bodywork of the vehicle. When in the secured position, the vehicle door is in a position just before the closed position thereof.

Known testing devices of this kind have the disadvantage that they can generally only be used for one vehicle model/type each. In workshop operations, it is therefore necessary to have a corresponding testing device available for each vehicle model/type. The need for different testing devices results, inter alia, from the circumstances of the different vehicle side windows, the differing inclination of the vehicle side windows and the different position of the window seals relative to the vehicle side window in the test position of the vehicle door. Furthermore, testing devices of this kind require a complex measurement setup in order to enable indirect determination of the contact pressure based on the readings. Small measurement deviations result in an incorrect determination of the contact pressures detected for the relevant position.

Proceeding from this, the object of the invention is to provide a universally applicable testing device that can be used for different vehicle types and models and that allows for reliable determination of the contact pressures.

This object is achieved according to the invention by a testing device having the features of claim 1. Advantageous further embodiments of the invention are set forth in the dependent claims.

In addition to a central processing unit having a power supply, an evaluation unit and a display unit for showing the determined contact pressure, the testing device according to the invention also comprises a pressure measuring film that can be removably arranged on the vehicle side window in the region of the window seal and that is connected to the evaluation unit of the central processing unit.

The pressure measuring film according to the invention is a planar pressure measuring element that has a low thickness and that can be arranged in the region between the window seal and the vehicle side window. In order to detect the contact pressure, the pressure measuring film comprises at least one sensor which is arranged in the measuring position between the vehicle side window and the window seal.

In order to transmit the measurement values determined by the sensor or sensors, the pressure measuring film is connected via suitable cables to the evaluation unit of the central processing unit, in which the measurement values are evaluated. After the measurement data have been evaluated, the determined contact pressure is displayed via a display unit of the central processing unit connected to the evaluation unit. The evaluation unit can correct influences on the contact pressure that may be caused by the thickness of the pressure measuring film, the pressure measuring film only exerting a negligible influence on the determined contact pressure on account of a preferably low thickness of said pressure measuring film of a few tenths of a millimeter.

The determined contact pressure is displayed via the display unit connected to the evaluation unit. In this regard, it is possible not only to specify the determined values, but also, and instead, to merely display that the determined contact pressure is within a predetermined range. For this purpose, the evaluation unit may be connected to a memory unit, in which the respective reference values are stored for comparison. The display then takes place, for example, in the form of a display showing "OK" or "not OK", it preferably also being possible to display to the user whether the contact pressure is too high or too low for information purposes. Any type of display, for example, may be used as the display unit.

By virtue of the testing unit according to the invention, it is possible to reliably check whether the frameless vehicle side window contacts the window seal in a uniform and flush manner, as a result of which wind noises are minimized and water ingress is prevented. A potentially required adjustment of the contact pressure of the vehicle side windows can be carried out with suitable tools, the testing device subsequently providing the reliable option of checking the correctness of the contact pressures.

The design of the pressure measuring film having pressure measuring sensors is in principle freely selectable, it being possible, using a pressure measuring film having just one pressure measuring sensor, to determine a contact pressure applied in the region of said pressure measuring sensor. According to an advantageous further embodiment of the invention, however, it is provided that the pressure measuring film comprises a plurality of pressure measuring sensors.

The use of a pressure measuring film having a plurality of pressure measuring sensors makes it possible to determine the contact pressure at various points using a single pressure measuring film. In particular, by using a pressure measuring film having a plurality of pressure measuring sensors, it is possible to arrange the pressure measuring film on the vehicle side window such that it surrounds the upper edge, and therefore the contact pressure exerted by the window seal on the outer face, end face and inner face of the vehicle side window can be determined by means of a pressure measuring film in the closed position of the vehicle side window. Furthermore, on account of a pressure measuring film having a plurality of pressure measuring sensors, it is also possible to determine the contact pressure acting on one side of the vehicle window at various points.

The pressure measuring film can in principle be arranged on the vehicle side window in any desired manner. According to a particularly advantageous embodiment of the invention, however, the pressure measuring film is connected to a positioning element, for example in the form of a gage, which ensures exact positioning of the pressure measuring film at the predetermined measuring points. The positioning elements may also be a bracket that engages around the vehicle side window, that is connected to the pressure measuring film and that ensures an exact alignment of the pressure measuring film relative to the vehicle side window after being positioned on a vehicle side window.

According to a further embodiment of the invention, it is provided that the pressure measuring film and/or the positioning element comprises alignment elements, in particular markings, for aligning the pressure measuring film on the vehicle side window. The use of alignment elements, which may for example be line markings on a transparent pressure measuring film, makes it easier to precisely position the pressure measuring film on the vehicle side window, in particular if said vehicle side window is provided for this purpose with markings corresponding to the measurement for aligning the pressure measuring film.

In principle, the pressure measuring film can be fastened to the vehicle side window in any desired manner. In a particularly simple embodiment, said film may for example be fixed using suitable adhesive tape or attached to the window edge after being aligned. According to a particularly advantageous embodiment of the invention, however, the pressure measuring film is designed for adhesive arrangement on the vehicle side window. This embodiment of the invention makes it possible to dispense with additional fastening elements. The adhesive connection is a secure and reliable positioning option, it being possible to remove the pressure measuring film in a simple, non-destructive manner from the vehicle side window after completion of the measurement and to use it for later measuring procedures.

According to another embodiment of the invention, it is provided that the central processing unit is designed for simultaneously connecting two, preferably three, particularly preferably four, pressure measuring films to the evaluation unit. This embodiment of the invention makes it possible to determine the relevant contact pressure by means of the central processing unit via pressure measuring films arranged at various points on the vehicle side window. This embodiment of the invention therefore makes it possible to determine the contact pressure at predetermined measuring points in a single measuring procedure, and therefore, unlike in other cases, it is not necessary to modify the pressure measuring film for the subsequent determination of the contact pressure at the predetermined measuring points.

The way in which the determined contact pressures are output on the display may in principle be chosen arbitrarily. Aside from merely displaying to the user the correctness of the determined contact pressures by comparison with a suitable database, it is also possible to display the determined contact pressures directly. According to a development of the invention, the display unit is designed to successively and/or simultaneously show the determined contact pressures of one or more pressure measuring films connected to the evaluation unit. This embodiment of the invention affords the user an immediate and accurate acquisition of the determined contact pressures, it being possible to establish particularly quickly whether the contact pressures are within the predetermined parameters, in particular in the case of a simultaneous display of the contact pressures. It is also possible for the evaluation unit to show the individual results one after the other within a specified display period.

The pressure measuring film may in principle be designed in any desired manner. According to a particularly advantageous embodiment of the invention, however, said film is designed to be flexible. The use of a flexible pressure measuring film makes it easier to arrange same on the vehicle side window and also makes it possible to adapt same particularly well to the shape of the vehicle side window. In addition, the flexible design ensures that the pressure measuring sensors contact the vehicle side window in a planar manner.

The central processing unit and the positioning element may in principle be designed in any desired manner. The central processing unit may for example also be a mobile telephone, a tablet, or the like. Furthermore, it is possible to design the central processing unit to be in a box-like housing with a display unit integrated in the housing. According to a particularly advantageous embodiment of the invention, the central processing unit and/or the positioning element can be releasably fastened to the vehicle bodywork and/or vehicle side window. Releasable fastening allows the user to position the central processing unit and/or positioning element such that they are arranged on the vehicle side window so as to be stationary during the measurements and so as to allow for a reliable view of the display unit. A suction cup connected to the central processing unit and/or the positioning element is an example of a possible means for the removable arrangement on the vehicle side window. Said suction cup allows for particularly simple and convenient removable arrangement of the central processing unit and/or positioning element on the vehicle side window.

Power may in principle be supplied to the display unit, evaluation unit and pressure measuring films in any desired manner. According to one possible embodiment, a storage battery, for example, is arranged in the central processing unit, it being possible to recharge said storage battery via suitable terminals after use. According to a particularly advantageous embodiment of the invention, however, it is provided that the central processing unit is designed for connection to an external power supply. The possibility of connecting the central processing unit to an external power supply ensures reliable operation of the evaluation unit, display unit and pressure measuring films. A combination in which the power can be supplied both via an integrated storage battery and via an external power supply is particularly advantageous.

An exemplary embodiment of the invention will be described below, with reference to one FIGURE. In the drawing:

FIG. 1 shows a perspective view of a testing device for determining a contact pressure of a vehicle side window on a window seal.

FIG. 1 shows a perspective view of a testing device 1 that is used to determine the contact pressure of a vehicle side window (not shown here) on a window seal (also not shown). In order to determine the contact pressure, the testing device 1 comprises a central processing unit 2, which is connected to a pressure measuring film of the testing device 1 via an evaluation unit (not shown here) integrated in the central processing unit 2 via a cable integrated in a connection piece 4.

The connection piece 4 connects the evaluation unit to the pressure measuring film comprising a plurality of pressure measuring sensors (not shown here), which film is connected to a positioning element designed as a bracket 5 in the exemplary embodiment shown. The bracket 5 makes it possible to arrange the pressure measuring film such that said film engages around the edge of the vehicle window, and therefore the pressure measuring film contacts portions of a window inner face, of the window outer face and of an end face of the vehicle side window 1. Suction cups 6 arranged opposite one another on the inside of the bracket 5 make it possible to precisely align and secure the pressure measuring film on the vehicle side window.

In the closed state of the vehicle side window, the pressure measuring film is loaded on all sides by the window seal. The contact pressure of the vehicle side window on the window seal can therefore be determined on all sides by means of pressure measuring sensors arranged so as to be distributed over the surface of the pressure measuring film.

The data obtained are evaluated via the evaluation unit of the central processing unit 2, which outputs the determined results via an LED display of a display unit 3 of the central processing unit 2.

The pressure measurement results may be output to the user in the form of exact values. Alternatively, it is possible to signal to the user that the determined contact pressures are correct or that they deviate from predetermined values by simply displaying "OK" or "Not OK". The central processing unit 2 optionally comprises a memory unit, in which the predetermined contact pressures for the relevant vehicle type are stored, such that comparison with the measurement data obtained is possible using the evaluation unit. The central processing unit 2 may also be designed for connection, in particular wireless connection, to an external memory unit.

LIST OF REFERENCE SIGNS

1 Testing device
2 Central processing unit
3 Display unit
4 Connection piece
5 Positioning element/bracket
6 Suction cup

The invention claimed is:

1. A testing device for detecting a contact pressure of a vehicle side window contacting a window seal arranged on the bodywork, comprising:
   a central processing unit comprising a power supply, an evaluation unit and a display unit for showing the contact pressure, and
   a pressure measuring film that can be removably arranged on the vehicle side window in the region of the window seal and that is connected to the evaluation unit of the central processing unit, wherein
   the pressure measuring film comprises a positioning element for removable arrangement on the vehicle side window,
   a suction cup is connected to the central processing unit configured to be removably arranged on the vehicle side window.

2. The testing device according to claim 1, wherein the pressure measuring film comprises a plurality of pressure measuring sensors.

3. The testing device according to claim 1, wherein the pressure measuring film and/or the positioning element comprises alignment elements, in particular markings, for aligning the pressure measuring film on the vehicle side window.

4. The testing device according to claim 1, wherein the pressure measuring film is designed for adhesive arrangement on the vehicle side window.

5. The testing device according to claim 1, wherein the central processing unit is designed for simultaneously connecting two, or three, or four pressure measuring films to the evaluation unit.

6. The testing device according to claim 1, wherein the display unit is designed to successively and/or simultaneously show the contact pressures of one or more pressure measuring films connected to the evaluation unit.

7. The testing device according to claim 1, wherein the pressure measuring film and/or the positioning element is flexible.

8. The testing device according to claim 1, wherein the central processing unit and/or the positioning element can be releasably fastened to the vehicle bodywork and/or vehicle side window.

9. The testing device according to claim 1, wherein the central processing unit is designed for connection to an external power supply.

10. A testing device, comprising:
    a central processing unit comprising a power supply, an evaluation unit, and a display unit for showing a contact pressure of a vehicle side window contacting a window seal arranged on a bodywork of the vehicle, and
    a pressure measuring film that can be removably arranged on the vehicle side window in the region of the window seal and that is connected to the evaluation unit of the central processing unit, wherein the pressure measuring film includes a positioning element configured to be removably arranged on the vehicle side window, and
    suction cups arrangeable on either side of the vehicle side window configured to arrange the central processing unit and/or the position element on the window.

11. The testing device according to claim 1, wherein the display unit is configured to show thereon a value representing the contact pressure of the vehicle side window contacting the window seal arranged on the bodywork.

12. The testing device according to claim 10, wherein the pressure measuring film comprises a plurality of pressure measuring sensors.

13. The testing device according to claim 12, wherein the pressure measuring film and/or the positioning element comprises alignment elements for aligning the pressure measuring film on the vehicle side window.

14. The testing device according to claim 12, wherein the pressure measuring film is designed for adhesive arrangement on the vehicle side window.

15. The testing device according to claim 12, wherein the central processing unit is designed for simultaneously connecting two, or three, or four pressure measuring films to the evaluation unit.

16. The testing device according to claim 12, wherein the display unit is designed to successively and/or simultaneously show the contact pressures of one or more pressure measuring films connected to the evaluation unit.

17. The testing device according to claim 12, wherein the pressure measuring film and/or the positioning element is flexible.

18. The testing device according to claim 12, wherein the central processing unit and/or the positioning element can be releasably fastened to the vehicle bodywork and/or vehicle side window.

19. The testing device according to claim 12, wherein the central processing unit is designed for connection to an external power supply.

20. The testing device according to claim 12, wherein the display unit is configured to show thereon a value representing the contact pressure of the vehicle side window contacting the window seal arranged on the bodywork.

* * * * *